United States Patent [19]
Ayala et al.

[11] Patent Number: 5,753,198
[45] Date of Patent: May 19, 1998

[54] HOT COAL GAS DESULFURIZATION

[75] Inventors: Raul Eduardo Ayala, Clifton Park; Timothy Leigh Chuck, Canajoharie; Venkat Subramaniam Venkataramani, Clifton Park, all of N.Y.

[73] Assignee: General Electric Company, Schenectady, N.Y.

[21] Appl. No.: 774,774

[22] Filed: Dec. 30, 1996

[51] Int. Cl.$^6$ .............. B01D 47/00; B01J 8/021; B01J 8/00; C01B 17/16
[52] U.S. Cl. .............. 423/210; 423/213.2; 423/230; 423/244.02; 423/244.06; 48/127.9
[58] Field of Search .............. 423/210, 213.2, 423/230, 244.02, 244.06; 48/127.9

[56] References Cited

U.S. PATENT DOCUMENTS

| | | | |
|---|---|---|---|
| 4,476,683 | 10/1984 | Shah et al. | 60/648 |
| 4,769,045 | 9/1988 | Grindley | 48/202 |
| 4,778,485 | 10/1988 | Suggitt et al. | 48/197 R |
| 4,832,704 | 5/1989 | Grindley | 48/197 R |
| 4,884,396 | 12/1989 | Miyamoto et al. | 60/39.12 |
| 4,999,030 | 3/1991 | Skinner et al. | 48/197 R |
| 5,227,351 | 7/1993 | Gasper-Galvin | 502/60 |
| 5,254,516 | 10/1993 | Gupta et al. | 502/84 |
| 5,313,781 | 5/1994 | Toda et al. | 60/39.12 |
| 5,403,366 | 4/1995 | Leininger et al. | 48/197 R |
| 5,447,702 | 9/1995 | Campbell et al. | 423/230 |
| 5,494,880 | 2/1996 | Siriwardane | 502/400 |
| 5,538,703 | 7/1996 | Flytzani-Stephanopoulos | 423/230 |
| 5,540,896 | 7/1996 | Newby | 422/172 |

*Primary Examiner*—Ardin H. Marschel
*Assistant Examiner*—Jezia Riley
*Attorney, Agent, or Firm*—Patrick K. Patnode; Marvin Snyder

[57] ABSTRACT

A method of fuel gas desulfurization comprises the steps of introducing fuel, such as coal, into a gasifier, heating the fuel in the gasifier to a temperature so as to form a gaseous fuel mixture containing sulfur compounds, and conveying the gaseous fuel mixture over a sulfur absorbing and surface-catalyzing zinc-based sorbent that catalyzes an exothermic reaction to locally increase the surface temperature of the sorbents, thereby enhancing the rate of desulfurization. Additionally, in accordance with the instant invention, the sulfur absorbing and surface-catalyzing zinc-based sorbent comprises a chemical composition of a metal selected from the group consisting of iron, cobalt, and molybdenum that catalyzes an exothermic reaction at the sorbent surface and an inert metal selected from the group consisting of titanium, zirconium, cerium and hafnium for desulfurization.

20 Claims, 3 Drawing Sheets

10

HOT COAL GAS DESULFURIZATION

BACKGROUND OF THE INVENTION

This application relates to coal gases, and in particular relates to the process of desulfurization of coal gases using surface-catalyzing zinc-based sorbents.

Coal deposits are widely distributed throughout the world, representing an attractive energy source. The efficiency of converting this fossil energy to commonly used electrical energy can be improved significantly if the coal is first gasified and the resulting hot fuel gas is oxidized in either a turbine or a fuel cell. One of the primary problems encountered during the gasification of coal is the generation of environment-polluting sulfur compounds such as hydrogen sulfide and carbon disulfide from the sulfur within the coal. A low Btu fuel gas can be produced by gasifying biomass, municipal solid waste, wood chips, heavy residual oil, petroleum coke, refinery wastes and other materials, as well as coal. As used herein, the term "fuel gas" is defined as any gas produced by any such gasification process.

Because of the wide range of gasifier outlet conditions, particularly temperature, many sorbents have been studied for hot fuel gas desulfurization. Early work focused on zinc or iron oxides. These sorbents react with hydrogen sulfide to form zinc and iron sulfides. The combination of zinc oxide, for removal of low concentrations of $H_2S$, and iron oxide, for higher desulfurization capacity per unit mass of sorbent, were the reasons for selection of zinc ferrite as an improvement over iron oxide ores for desulfurization of coal gases. $H_2S$ reacts with zinc ferrite according to the reaction,

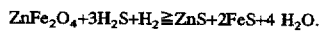

$$ZnFe_2O_4 + 3H_2S + H_2 \rightleftarrows ZnS + 2FeS + 4\,H_2O.$$

A potential limitation of sorbents containing a high concentration of iron such as zinc ferrite (>46% wt. Iron, Fe) is that zinc ferrite sorbent performance in high-temperature desulfurization is very sensitive to temperature and coal gas composition. For instance, in the presence of coal gases with high $H_2$ content (about 30–40%) or high $CO/CO_2$ molar ratios (about 4:1) as in oxygen-blown gasifiers, the iron portion of zinc ferrite is reduced to FeO or Fe, which leads to the formation of significant amounts of iron carbide $Fe_3C$, disrupting the original zinc ferrite crystal structure.

Zinc oxide (ZnO) can achieve a higher degree of gas desulfurization than iron oxide. A drawback to ZnO has been that, in highly reducing atmospheres, such as in gasifier exit gases with high $H_2$ and CO contents, zinc oxide is partially reduced to elemental zinc, a liquid above 419° C., which zinc has considerable vapor pressure at the hot gas cleanup temperatures (>550° C.). Thus, zinc can migrate through the porous solid phase and condense on cooler sorbent surfaces, producing a dense ZnS layer on parts of the reacting particles, thereby slowing the reaction rate and enhancing undesirable sintering.

Testing of mixed oxide sorbents has also been undertaken, since these sorbents generally offer physical advantages, such as more homogenous dispersion and a lower propensity to sintering, and chemical advantages such as improved activity and regenerability, compared to uncombined active oxides. For instance, zinc ferrite ($ZnFe_2O_4$) is a better overall sorbent than either of its constituent oxides and has been extensively studied for hot fuel gas cleanup applications. Zinc Ferrite, however, forms significant amounts of $Fe_3C$, Fe, and FeO (all of which have different crystal structures than zinc ferrite $ZnFe_2O_4$) which will not recombine to zinc ferrite during regeneration. The result is the presence of two or more separate phases producing cracking or spalling (peeling) of the sorbent particles. Accordingly, as with zinc oxide, formation of zinc vapor limits the use of zinc ferrite to a temperature up to about 550° C. and to mildly reducing environments.

Zinc titanates, such as $Zn_2TiO_4$, $ZnTiO_3$, or $Zn_2Ti_3O_8$, have also been studied, since they exhibit slower reduction to volatile zinc than zinc oxide. Similar to zinc ferrite, however, there is some reduction of the zinc titanates to zinc vapor, more so from ZnO rich compositions. In these zinc titanates, zinc vapor can migrate through the porous solid phase and condense on cooler sorbent surfaces, thus producing a dense ZnS layer on parts of the reacting particles that slows the reaction rate and enhances undesirable sintering.

For sorbents containing zinc as the major constituent, such as zinc titanate and other zinc-oxide based sorbents, the rate of $H_2S$ removal (i.e., the desulfurization reactivity) is highly dependent on the reaction temperature. For instance, for porous pellets of zinc titanate, where the desulfurization reaction is mostly pore-diffusion limited, the global reaction rate at 1000° F. (538° C.) is twice the rate as at 800° F. (427° C.). If a hot fuel gas desulfurization system has been sized for operation at 1000° F. (538° C.) and the incoming fuel gases enter at around 800° F. (427° C.), the rate of desulfurization may be so low that the system can only accomplish a fraction of the originally intended desulfurization.

When using pelletized, porous mixed-metal oxide sorbents, the overall reaction rate depends on the temperature of operation. If the temperature of operation is above 1000° F. (538° C.), the measured (global) rate of reaction is determined by the rate of $H_2S$ diffusion through the pores of the sorbent pellets (i.e., the pore diffusion resistance). In the range of about 800° F.–1000° F. (427° C.–538° C.), the global rate is mostly determined by the pore diffusion resistance, but there is also a contribution by the intrinsic reaction rate at the surface of the sorbent. The lower the temperature, the lower the intrinsic rate of reaction. If the temperature of operation is below about 750° F.–800° F. (399° C.–427° C.), the intrinsic reaction rate is the only major controlling mechanism. It would be highly desirable to formulate a sorbent that can operate at lower temperatures and exhibit the reactivity typical of higher-temperature operations.

SUMMARY OF THE INVENTION

In accordance with the instant invention, a method of fuel gas desulfurization comprises the steps of introducing fuel, such as coal, into a gasifier, heating the fuel in the gasifier to a temperature so as to form a gaseous fuel mixture containing sulfur compounds, and conveying the gaseous fuel mixture over a sulfur absorbing and surface-catalyzing zinc-based sorbent that catalyzes an exothermic reaction to locally increase the surface temperature of the sorbents, thereby enhancing the rate of desulfurization. Additionally, in accordance with the instant invention, the sulfur absorbing and surface-catalyzing zinc-based sorbent comprises a chemical composition of a metal selected from the group consisting of iron, cobalt, and molybdenum that catalyzes an exothermic reaction at the sorbent surface and an inert metal selected from the group consisting of titanium, zirconium, cerium and hafnium for desulfurization.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
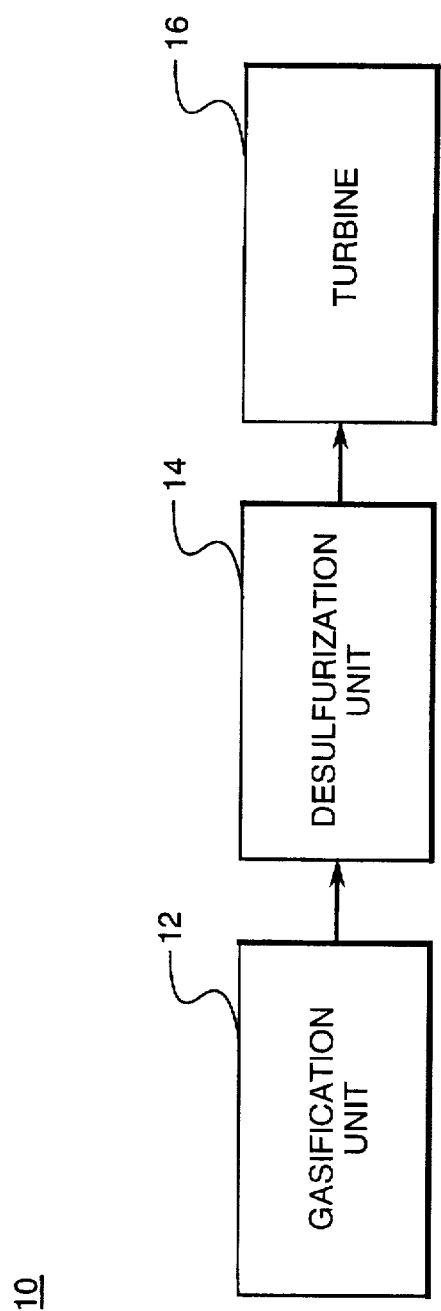
FIG. 1 is a block diagram representation of an exemplary coal gasification system.

A fuel gasification system 10 includes a gasification unit 12, a desulfurization unit 14, and a turbine 16, as shown in FIG. 1. As is known and understood in the art, gasification unit 12 comprises a gasifier, such as an oxygen-blown gasifier in which coal, or the like, is reacted with steam in the presence of oxygen to produce hot fuel gas. The fuel gas produced by gasification unit 12 is delivered to desulfurization unit 14 to remove sulfur pollutants from the hot fuel gas. The resulting desulfurized hot fuel gas is ultimately burned and expanded in turbine 16 to generate power.

Coals have variable sulfur content that depends on location and age of the coal reserve. Typically, coals have sulfur levels that are too high for direct utilization in power generation processes. Accordingly, sulfur removal must be accomplished prior to combustion, during combustion, or by post-combustion processing of the exhaust stream. With the ever increasing limitations on $SO_2$ emissions, even most low sulfur coals will eventually require some treatment at some point during their utilization. Current coal gasification technology relies on removal of some of the relatively easy inorganic fraction during coal cleaning (ash removal).

The implementation of hot coal gas desulfurization heavily relies on the development of regenerable sorbent materials that have high sulfur capacity and can efficiently remove $H_2S$ (from several thousand parts per million (ppm) levels down to a few parts per million (ppm)) over many cycles of sulfidation and regeneration.

Over the last decade a number of studies have been reported on high-temperature $H_2S$ removal, primarily using various transition metal oxides as regenerable sorbents. The sorbent most studied is iron oxide, which yields equilibrium $H_2S$ concentrations in the few hundred ppm range for a composition representative of low Btu coal derived gas and temperatures of above 500° C. While the sulfidation kinetics of iron oxide are very good, this sorbent cannot be used for single-stage coal gas desulfurization to reduce the $H_2S$ content of the fuel gas down to a few ppm of sulfur.

Zinc oxide has been used as a non-regenerable and a regenerable sorbent. The thermodynamic equilibrium for sulfidation of ZnO is quite favorable, yielding desulfurization down to a few ppm $H_2S$. The sulfidation kinetics of ZnO, however, are much slower compared to those of iron oxide, and the regenerability of ZnO is restricted by the loss of surface area at high temperatures and the formation of zinc sulfate at low regeneration temperatures.

Reduction and sulfidation take place simultaneously when a sorbent is contacted with the hot fuel gas. Regeneration can be conducted with air or air-steam mixtures. When reaction and diffusion rates are sufficiently rapid, the sorbent sulfur capacity and the extent of desulfurization are determined by thermodynamics alone.

In recent years it has been shown that certain mixed oxides have superior properties compared to single oxides for hot gas cleanup. Work on zinc titanates such as $ZnTiO_3$, $Zn_2TiO_4$ and $Zn_2Ti_3O_8$ has shown that titanium oxide is a better alternative to iron oxide additives in terms of the higher stability of the titanates over the ferrite compounds of zinc, and their similar sulfidation equilibria. With zinc titanates, the sulfidation temperature has been shown better attrition resistance than zinc ferrite in pilot tests. This sorbent also suffers gradual loss of reactivity in long-term cyclic operation, resulting in high fresh sorbent makeup rate to maintain the desired level of desulfurization.

Although adequate desulfurization has been achieved previously, it would be desirable to provide even better desulfurization. Of course, such enhanced desulfurization would be provided without significantly increasing material and operational costs.

In accordance with the instant invention, desulfurization unit 14 includes a sulfur absorbing and surface-catalyzing zinc-based sorbent that catalyzes an exothermic reaction to locally increase the surface temperature of the sorbent, thereby enhancing the rate of desulfurization.

Intrinsic reaction rates are typically exponentially dependent on temperature, either in an upward or in a downward direction. Ideally, fuel gas desulfurization operations should run reactions that have rate expressions that increase with temperature at the highest possible temperature, subject to engineering and practical constraints. One way to run reactions faster at any given inlet gas temperature is by catalyzing other exothermic reactions at the surface of a sorbent pellet, locally increasing the sorbent pellet surface temperature and effectively increasing the reaction kinetics. For instance, the water gas shift reaction,

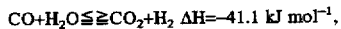

is exothermic in the forward direction. Since heat is generated at a pellet's surface, if the desulfurization reaction occurs simultaneously, the desulfurization reaction will run faster because of the higher local temperatures at the pellet's surface.

A second reaction that increases pellet surface temperature is the methane formation, or methanation reaction:

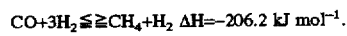

The methanation reaction is also exothermic in the forward direction.

In accordance with the instant invention, the sulfur absorbing and surface catalyzing zinc-based sorbent catalyzes either the water-gas shift reaction or any other exothermic reaction, such as the methanation reaction, with the purpose of enhancing the rate of desulfurization. The heat produced from the exothermic reaction raises the temperature of the sorbent surface, where desulfurization takes place, thereby increasing the rate of desulfurization.

In accordance with the instant invention, the sulfur absorbing and surface catalyzing zinc-based sorbent comprises metal additives, such as iron, cobalt, or molybdenum, so that a typically non-catalytic zinc based compound is made active towards exothermic reactions, as shown above. Water-gas shift catalysts, such as cobalt or molybdenum, are currently available, and are resistant to sulfur poisoning, especially around 400° F.

In accordance with the instant invention, the above mentioned metal species are incorporated into a zinc oxide bearing compound additionally containing oxides of other elements such as titanium, zirconium, cerium, or hafnium, to create catalytic activity at the sorbent surface.

Figure 2:
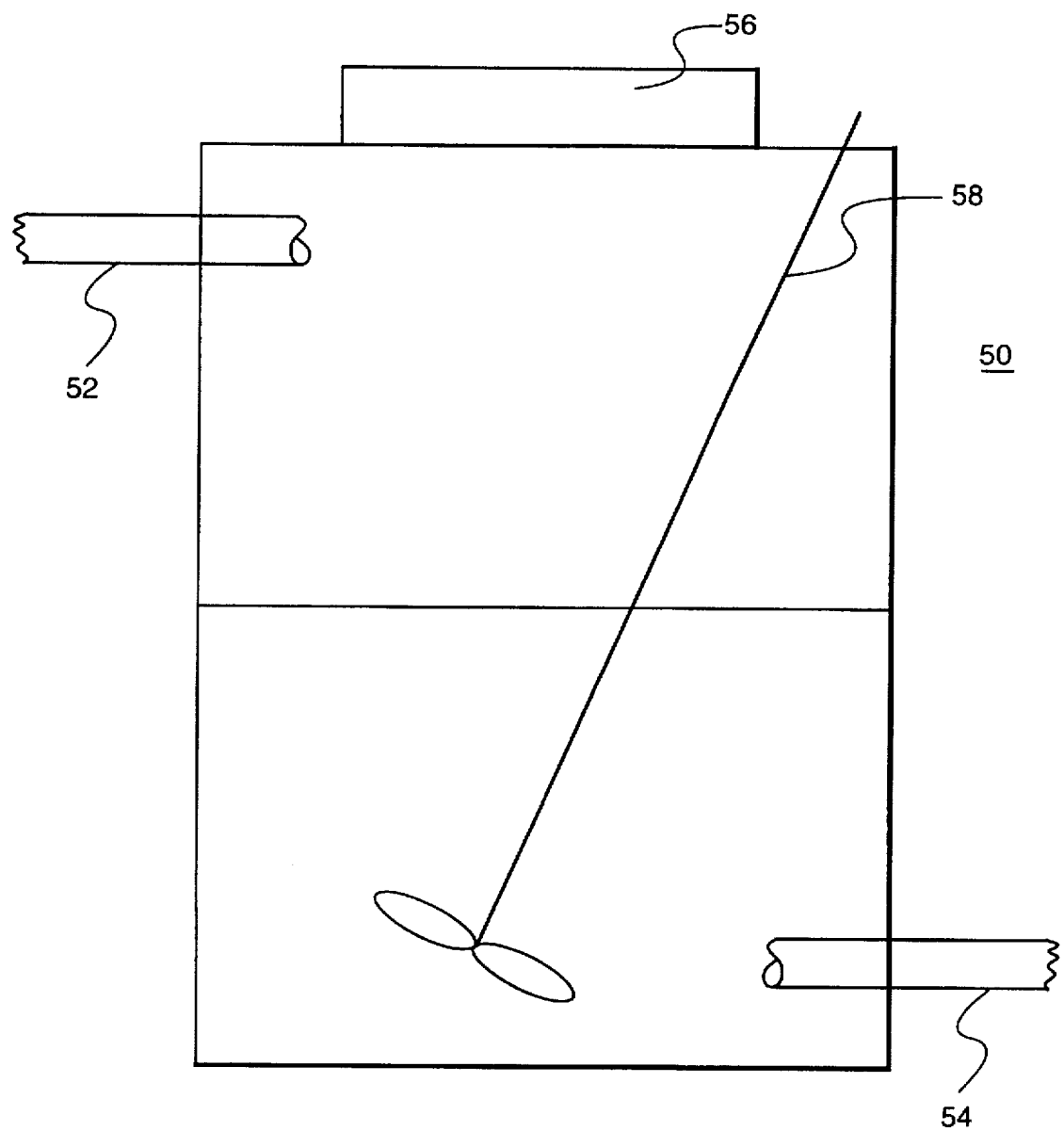
FIG. 2 is an frontal plan view of an exemplary mixing vessel.

A mixing vessel 50 for preparation of sorbents comprises an inlet 52, an outlet 54 and a powder feed port 56, as shown in FIG. 2. In mixing the sorbent of the instant invention, small concentration powder components are added, utilizing conventional powder handling devices (not shown), through powder feed port 56. The term "small concentration powder component," as used herein, is defined as any component whose concentration is less than about 10% of the total mass of the sorbent. Small concentration powders include the metal additive powders, such as iron, cobalt, molybdenum, or the like, fluxing agents, such as clays and bentonites and grain growth inhibitors (e.g., Magnesium oxide (MgO)), and powder pore formers, such as methylcellulose derivatives. Dry mixing, aeration, or tumbling may be utilized to promote thorough mixing of the powders.

Next, liquid components are added to promote the dispersibility and stability of the desired wet powders or suspensions. These liquids can be, for instance, de-ionized water; additives for pH adjustment, such as ammonium hydroxide; surfactants, such as wetting and suspension stabilizers; and pore formers. Once the desired liquid components are added to the small concentration powders, the mixing vessel is stirred to promote mixing by means of a mixer 58, which mixer 58 may comprise an internal stirrer, beads as in ball mills, rollers or any means of mixing between the powders and the liquids.

After the liquids and the small concentration powders are mixed, major powder components are added.

The term "major powder component," as used herein, is defined as any component whose concentration is more than about 10% of the total mass of the sorbent. Such major powder components need to be intimately mixed with the small concentration components and liquids to ensure microscopic homogeneity. Such major powder components are zinc oxide and titanium dioxide, or the like for the case of zinc titanates and supported zinc-based sorbents.

Upon completion of thorough mixing, excess liquids should be removed from mixing vessel 50 via outlet 54. The amount of excess liquid will depend on the consistency needed for the particular particle size, enlargement or forming operation selected.

The resulting thoroughly mixed blend is transferred to a forming unit, to obtain the proper shape of the sorbent particles for a particular application. Sorbent pellets or granules of various sizes and shapes can be made for different applications including fluidized beds, moving beds, or transport reactors.

Finally, the formed sorbents will be dried under air in a calcining unit, or the like. Heat treatment is applied to the formed sorbents such that the proper internal morphology and chemical structure is achieved.

EXAMPLE 1

Zinc Titanate ($Zn_2TiO_4$) is a cubic inverse spinel compound of the structure type $B(AB)O_4$ where B is the Zn ion and A is the Ti ion. Iron (Fe III) can be substituted either for the Zn or the Ti ion in either of the available octahedral or the tetrahedral sites due to its similar ionic size in the corresponding coordination by suitable adjustment of the Zinc to titanium molar ration. The substituted compound will thus form a solid solution similar to the zinc titanate. The substituted compositions studied are given in Table 1. ZT(1) is the undoped zinc titanate which represents the base case of no added iron with a Zn:Ti atomic ratio of 2:1 (i.e., $Zn_2TiO_4$). ZT(2), ZT(3), and ZT(4) are compositions with iron substitutions at 3, 15, and 30 atomic percent replacing equal amounts of Zn and Ti maintain the charge balance. ZT(5) and ZT(6) are compositions with iron substitutions at 15 atomic percent replacing only Zn in ZT(5), and Ti in case of ZT(6).

TABLE 1

| FORMULATION ID | CHEMICAL COMPOSITION | COMMENT |
|---|---|---|
| ZT(1) | $Zn_2TiO_4$ | Base Composition |
| ZT(2) | $Zn_{1.985}Ti_{0.985}Fe_{0.03}O_4$ | 3 Atomic Percent of Fe Replacing Equal Amounts of Zn and Ti |
| ZT(3) | $Zn_{1.925}Ti_{0.925}Fe_{0.15}O_4$ | 15 Atomic Percent of Fe Replacing Equal Amounts of Zn and Ti |
| ZT(4) | $Zn_{1.85}Ti_{0.85}Fe_{0.30}O_4$ | 30 Atomic Percent of Fe Replacing Equal Amounts of Zn and Ti |
| ZT(5) | $Zn_{1.85}Fe_{0.15}TiO_4$ | 15 Atomic Percent of Fe Replacing Zn Only |
| ZT(6) | $Zn_2Ti_{0.85}Fe_{0.15}O_4$ | 15 Atomic Percent of Fe Replacing Ti Only |

In the $Zn_2TiO_4$ structure (classified as inverse spinel structures), the addition of metal atoms in coordination with the oxygen adds up to three metal atoms coordinated with four oxygen atoms. This ratio ensures atomic charge balance. For an iron-substituted zinc titanate, one possible combination is $Zn_2Ti_{0.85}Fe_{0.15}O_4$ (as in example ZT(6)), where 0.15 atoms of iron replace 0.15 atoms of titanium while the number of zinc atoms remains constant. The total number of metal atoms (Zn+Ti+Fe) remains at three whole atoms. Other combinations can be used where the substitution atom (iron for instance) partially replaces both zinc and titanium atoms in the same compound, as shown in the other combinations of the above table.

The most desired combinations of substitutions in zinc titanates can be selected for a particular existing process operating conditions (e.g., in order to minimize iron sulfate formation or minimize iron carbide formation in the presence of high CO in the coal gas, or maximize the exothermic heat generated for catalysis of the water-gas shift reaction). These metal substitutions are possible as long as the substitution atoms do not exceed the solid solubility limits in the zinc titanate crystalline structure.

The same approach of substitution in zinc titanates can be applied to crystal structures other than zinc titanate, for instance, zinc ferrite, zinc oxide, copper oxide, copper ferrite, or any other binary metal oxide crystal structure that can accept the combinations of 2+, 3+, 5+, 6+ ions such as magnesium (Mg), aluminum (Al), niobium (Nb), technetium (Tc), tungsten (W), or molybdenum (Mo). For the general case of zinc in the inverse spinel crystal structure, the crystal structure would be described as $(Zn_x)N_z^{4+}M_y^{k+}O_{x+2z+ky/2}$. Additionally, for the case of zinc in the inverse spinel crystal structure including one or more oxide additions, the crystal structure would be described as:

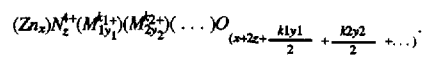

In the above equations, M is one or more metals that catalyzes an exothermic reaction, N is an inert metal for desulfurization, x has a value in the range of about 0 to about 2, and y has a value in the range of about 0 to about 3.

The compositions were prepared using the conventional ceramic processing methods of mixing the oxides (ZnO, $TiO_2$, $Fe_2O_3$) in a ball mill in alcohol, drying and calcining the dried mixture at 750° C. for three hours.

Further calcining of the compositions at 900° C. for three hours resulted in a predominantly single phase spinel product $Zn_2TiO_4$.

The reactivity of the sorbent formulations was measured using a thermogravimetric analyzer (TGA). The mass gained by the sample is proportional to the mass of sulfur from $H_2S$ reacted with the powder. Approximately 35 mg of sorbent was placed in a sample pan and suspended from the TGA micro balance. The sample was then heated to 800° F. at atmospheric pressure. A simulated fuel gas composition (41.7% CO, 13.7% $CO_2$, 31.6% $H_2$, 10.0% $H_2$, and 3.0% $H_2S$) was passed over the sample at a rate of 75 ml/min. When $H_2S$ reacts with the powder sample, the increase in sorbent weight is measured and recorded by the TGA. A relative comparison of weight percentages as a function of time gives a way of comparing the relative sorbent reactivities.

Figure 3:
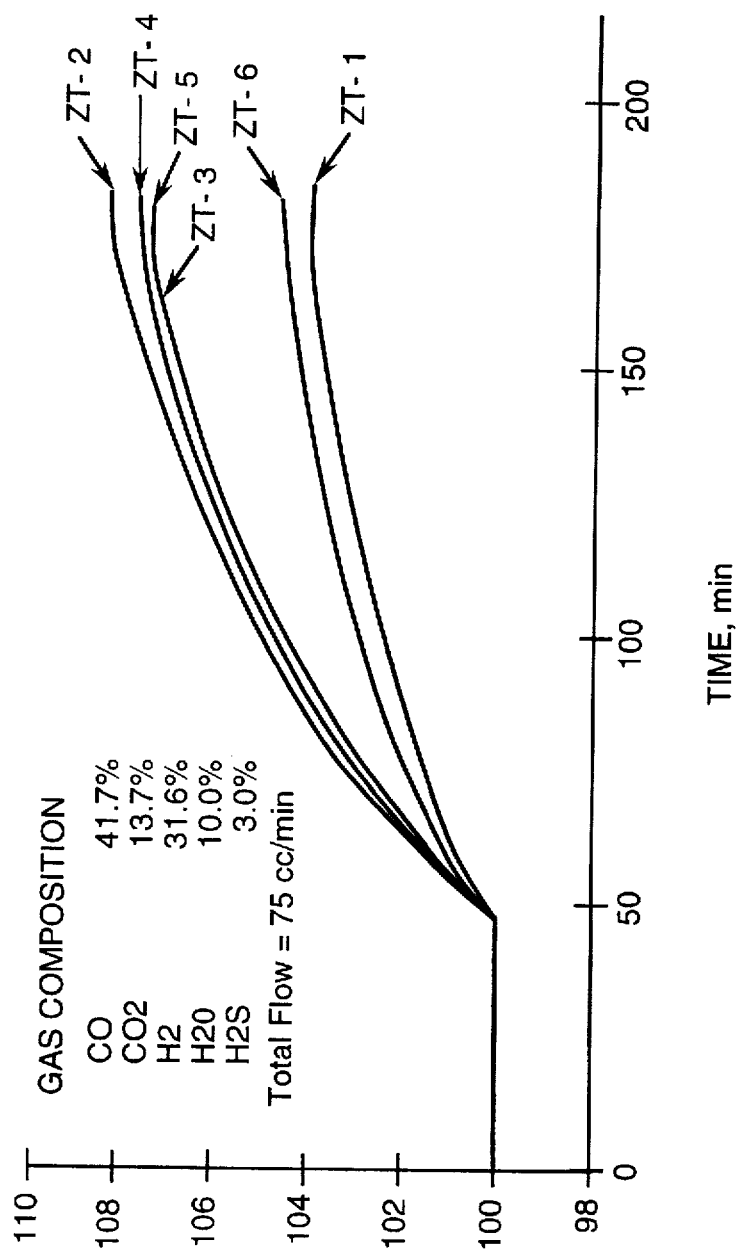
FIG. 3 is a graphical comparison of sulfur weight gained over time due to desulfurization at 800° F. (427° C.) as a function of time for several formulations of zinc titanate in accordance with the instant invention.

FIG. 3 shows the weight gained due to desulfurization at 800° F. as a function of time for the formulations calcined at 750° C. shown in Table 1.

Comparing ZT(1) with ZT(2)–ZT(6) we see that replacing a percentage of Zn or Ti with Fe increases the chemical reactivity of the powder.

FIG. 3 shows the relative weight of the sample as a function of time during the exposure of the powder with a simulated coal gas composition in a thermogravimetric analyzer (TGA). In the first fifty minutes of each test, a sorbent sample was heated to 800° F. (427° C.).

No hydrogen sulfide ($H_2S$) was added to the gas mixture in this time period. The weight of the sample was stable at 100% indicating that there were no chemical reactions taking place by which the sample would either loose or gain weight. At 50 minutes, pure $H_2S$ gas was blended into the mixture to give a total $H_2S$ concentration of 1% by volume.

As the $H_2S$ was introduced, the samples gain weight due to the sulfidation reaction. For $Zn_2TiO_4$, zinc titanate, the sulfidation reaction is

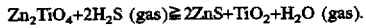

$Zn_2TiO_4 + 2H_2S \text{ (gas)} \rightleftharpoons 2ZnS + TiO_2 + H_2O \text{ (gas)}$.

The higher the temperature of the sorbent, the faster the sulfidation reaction of zinc titanate will occur and the higher the measured weight gain is at any given time.

According to the above reaction, the weight to be gained by $Zn_2TiO_4$ can be calculated to be approximately 12% of the reaction carried out to saturation. As seen in the plots, over the first two hours, each sample increases in weight from about 100% to about 108%, indicating a significant sulfidation of the samples over the two-hour test. As seen in the figure, the rate of weight gained by the ZT(1) sample (containing just zinc titanate with no other metal additives) is lower than formulation ZT(2)–ZT(6), that contain different compositions of iron oxide additive. The increase in sulfidation of the zinc titanate with iron is directly a result of the iron oxide additive used. Note also that in ZT(5), the amount of added iron was balanced by the amount of zinc subtracted from the solid composition, so that the expected weight gain at saturation of ZT(5) is the same as that of ZT(1), which has no iron added. Despite of this balancing of sulfur capturing metals, the weight gain by ZT(5) is higher than that for ZT(1), confirming the catalytic effect of iron.

Since before adding the $H_2S$ to the gas mixture there was no weight gain in any of the sorbent sample, the enhancement in sulfidation of the sorbent is a catalytic process: no weight changes are measured and hence the sorbent chemical composition is the same before and after exposure to the gas mixture without $H_2S$. The CO content decreases and the $CO_2$ increases in the gas with a corresponding evolution of heat. This heat produced is what makes the sorbent surface hotter than the flowing gas so that the measured rate of sulfidation (and weight gain) is faster for catalyzed reactions than for those that are not. A similar catalytic process occurs with the methanation reaction, also shown above, where the consumption of CO and $H_2$ result in production of methane and heat generation at the sorbent surface.

Titanium is inert towards desulfurization and aids by preventing the reduction of zinc oxide to zinc metal with further zinc loss due to vaporization at these temperatures. Comparison of ZT(1) with ZT(5) in FIG. 3, details the effect of iron addition on reactivity when the iron replaces the zinc for desulfurization in compositions near a 2:1 Zn:Ti molar ratio. If the sulfur absorbing surface-catalyzing zinc-based sorbent did not catalyze the water-gas shift reaction at the sorbent surface, the sorbent would have the same reactivity as a conventional zinc titanate. The sulfur absorbing surface-catalyzing zinc-based sorbent of the instant invention, however, catalyzes an exothermic reaction at the sorbent surface, locally increasing the heat, thereby resulting in an increased desulfurization rate for the sorbent.

While only certain features of the invention have been illustrated and described herein, many modifications and changes will occur to those skilled in the art. It is, therefore, to be understood that the appended claims are intended to cover all such modifications and changes as fall within the true spirit of the invention.

We claim:

1. A method of fuel gas desulfurization, comprising the following steps:

introducing a fuel into a gasifier;

heating the fuel in the gasifier to a temperature so as to form a gaseous fuel mixture containing sulfur compounds;

conveying the gaseous mixture over sulfur absorbing surface-catalyzing zinc-based sorbents that catalyze an exothermic reaction to locally increase the surface temperature of said sorbents therein enhancing the rate of desulfurization.

2. A method of coal gas desulfurization, in accordance with claim 1, wherein said desulfurization is carried out at gasifier temperatures below 1000° F.

3. A method of coal gas desulfurization, in accordance with claim 1, wherein said zinc-based sorbent has a chemical composition of $Zn_xMyN_zO_4$ where:

M is a metal that catalyzes said exothermic reaction;

N is an inert metal for desulfurization;

x has a value in the range of about 0 to about 2;

y has a value in the range of about 0 to about 0.3; and z has a value in the range of about 0 to about 3.

4. A method of coal gas desulfurization, in accordance with claim 3, wherein M is a metal selected from the group consisting of iron, cobalt, and molybdenum.

5. A method of coal gas desulfurization, in accordance with claim 3, wherein N is an inert metal selected from the group consisting of titanium, zirconium, cerium, and hafnium.

6. A sulfur absorbing and surface-catalyzing zinc-based sorbent material comprising a chemical composition of $Zn_xMyN_zO_4$ where:

M is a metal that catalyzes an exothermic reaction;

N is an inert metal for desulfurization;

x has a value in the range of about 0 to about 2;

y has a value in the range of about 0 to about 0.3; and z has a value in the range of about 0 to about 3.

7. A zinc-based sorbent material, in accordance with claim 6, wherein M is a metal selected from the group consisting of iron, cobalt, and molybdenum.

8. A zinc-based sorbent material, in accordance with claim 6, wherein N is an inert metal selected from the group consisting of titanium, zirconium, cerium, and hafnium.

9. A fuel gasification system comprising:

a gasifier;

a desulfurization unit including a sulfur absorbing and surface-catalyzing zinc-based sorbent material comprising a chemical composition of $Zn_xMyN_zO_4$ where:

M is a metal that catalyzes an exothermic reaction;

N is an inert metal for desulfurization;

x has a value in the range of about 0 to about 2;

y has a value in the range of about 0 to about 0.3; and z has a value in the range of about 0 to about 3; and a turbine disposed so as to receive fuel gas from said desulfurization unit.

10. A zinc-based sorbent material, in accordance with claim 9, wherein M is a metal selected from the group consisting of iron, cobalt, and molybdenum.

11. A zinc-based sorbent material, in accordance with claim 9, wherein N is an inert metal selected from the group consisting of titanium, zirconium, cerium, and hafnium.

12. A sulfur absorbing and surface-catalyzing zinc-based sorbent material comprising a chemical composition of $Zn_xMyN_zO_3$ where:

M is a metal that catalyzes an exothermic reaction;

N is an inert metal for desulfurization;

x has a value in the range of about 0 to about 2;

y has a value in the range of about 0 to about 0.3; and z has a value in the range of about 0 to about 3.

13. A zinc-based sorbent material, in accordance with claim 12, wherein M is a metal selected from the group consisting of iron, cobalt, and molybdenum.

14. A zinc-based sorbent material, in accordance with claim 12, wherein N is an inert metal selected from the group consisting of titanium, zirconium, cerium, and hafnium.

15. A sulfur absorbing and surface-catalyzing zinc-based sorbent material comprising a chemical composition of $Zn_xMyN_zO_8$ where:

M is a metal that catalyzes an exothermic reaction;

N is an inert metal for desulfurization;

x has a value in the range of about 0 to about 2;

y has a value in the range of about 0 to about 0.3; and z has a value in the range of about 0 to about 3.

16. A zinc-based sorbent material, in accordance with claim 15, wherein M is a metal selected from the group consisting of iron, cobalt, and molybdenum.

17. A zinc-based sorbent material, in accordance with claim 15, wherein N is an inert metal selected from the group consisting of titanium, zirconium, cerium, and hafnium.

18. A sulfur absorbing and surface-catalyzing zinc-based sorbent material comprising a chemical composition of $(Zn_x)N_z^{4+}M_y^{k+}O_{x+2z+ky/2}$ where:

M is a metal that catalyzes an exothermic reaction;

N is an inert metal for desulfurization;

x has a value in the range of about 0 to about 2;

y has a value in the range of about 0 to about 0.3;

z has a value in the range of about 0 to about 3; and x+2z+ky/2 has a value in the range of about 0 to about 8.

19. A zinc-based sorbent material, in accordance with claim 18, wherein M is a metal selected from the group consisting of iron, cobalt, and molybdenum.

20. A zinc-based sorbent material, in accordance with claim 18, wherein N is an inert metal selected from the group consisting of titanium, zirconium, cerium, and hafnium.

* * * * *